(12) United States Patent
Heinonen

(10) Patent No.: US 11,610,119 B2
(45) Date of Patent: Mar. 21, 2023

(54) METHOD AND SYSTEM FOR PROCESSING SPATIAL DATA

(71) Applicant: Ai4 International Oy, Helsinki (FI)

(72) Inventor: Tero Heinonen, San Francisco, CA (US)

(73) Assignee: Ai4 International Oy, Helsinki (FI)

( * ) Notice: Subject to any disclaimer, the term of this patent is extended or adjusted under 35 U.S.C. 154(b) by 561 days.

(21) Appl. No.: 16/797,049

(22) Filed: Feb. 21, 2020

(65) Prior Publication Data

US 2021/0264245 A1 Aug. 26, 2021

(51) Int. Cl.
  *G06N 3/08* (2006.01)
  *G06K 9/62* (2022.01)
  *G06N 3/04* (2006.01)

(52) U.S. Cl.
  CPC .............. *G06N 3/08* (2013.01); *G06K 9/628* (2013.01); *G06K 9/6261* (2013.01); *G06N 3/04* (2013.01)

(58) Field of Classification Search
  CPC .......... G06N 3/08; G06N 3/04; G06N 3/0454; G06K 9/6261; G06K 9/628; G06K 9/6232; G06V 10/764; G06V 10/7715; G06V 10/82; G06V 20/64
  See application file for complete search history.

(56) References Cited

U.S. PATENT DOCUMENTS

| | | | | |
|---|---|---|---|---|
| 9,562,771 | B2 * | 2/2017 | Heinonen | G01C 21/005 |
| 10,740,606 | B2 * | 8/2020 | Metzler | G06K 9/6262 |
| 2019/0147245 | A1 * | 5/2019 | Qi | G06V 10/82 |
| | | | | 382/103 |
| 2020/0342250 | A1 * | 10/2020 | Smirnov | G06T 7/10 |
| 2021/0342609 | A1 * | 11/2021 | Smolyanskiy | G06V 20/56 |
| 2021/0390458 | A1 * | 12/2021 | Blumstein | G06N 3/08 |

* cited by examiner

*Primary Examiner* — Wesley J Tucker
(74) *Attorney, Agent, or Firm* — Ziegler IP Law Group LLC

(57) ABSTRACT

A method for classifying a spatial data carried out by a data computing environment. The method includes: receiving a spatial data from a data source; generating a first feature from the spatial data; dividing the first feature into a first sub-feature and a second sub-feature; analysing the first sub-feature to derive a first sub-feature data; analysing the second sub-feature to derive a second sub-feature data; using the first sub-feature data and the second sub-feature data as a first input data for analysing the first feature; and analysing at least one of the first sub-feature data, the second sub-feature data, and the first feature to classify the spatial data into a plurality of object classes.

16 Claims, 6 Drawing Sheets

METHOD AND SYSTEM FOR PROCESSING SPATIAL DATA

TECHNICAL FIELD

The present disclosure relates generally to spatial data processing technologies; and more specifically, to methods and data computing environments for classifying spatial data.

BACKGROUND

Generally, spatial data is also known as geospatial data, for example, spatial point cloud data or two-dimensional spatial data. A point cloud is a collection of three-dimensional (3D) positions in space. Typically, large amounts of measurement data generated by a 3D scanning device are represented in a form known as the spatial point cloud data. Examples of the 3D scanning device may include, but are not limited to a laser range finder, such as light detection and ranging (LIDAR), or laser detection and ranging (LADAR) device. Such spatial point cloud data are increasingly used in several applications, for example, 3D data visualization, map creation, geographic information systems, georeferencing systems, and the like. Currently, the known manual, fully automated, or semiautomated methods for processing of spatial point cloud data are slow and inaccurate.

In an example, the known manual methods rely on people who view such spatial point cloud data obtained from the 3D scanning devices and manually mark different features or manually classify group of points in the spatial point cloud data. This is very slow and expensive process as voluminous data, typically in tera- or petabytes, needs to be transferred to a certain designated location for manual analysis. Tens or hundreds of people may be needed to label the data, which is time consuming (e.g. may take weeks to months). Moreover, all such data then requires a manual visual quality analysis to compensate for human errors and difference in human interpretation, which is thus, a time intensive, a cost intensive, and an error-prone process.

In another example, conventional fully automated methods are typically based on one of: A) manually created algorithms for classifying individual points; B) manually created algorithms for extracting features and objects; C) conventional machine learning methods to classify points in point cloud; and D) conventional machine learning methods to extract features and objects in point cloud. There are many technical problems encountered in the conventional fully automated methods related to manually created algorithms for classifying individual points or for extracting features and objects. For example, manually creating a new algorithm for a new use case (e.g. a new type of classification or a new type of point cloud data) may take months to years. Moreover, the manually created algorithms typically work only with data similar to the data used in creating the algorithm, and hence do not scale suitably across different geographies, environments, use cases, or other industries.

There are many technical problems in the conventional fully automated methods related to conventional machine learning techniques used to process points in a point cloud. For example, the conventional methods for processing points in a point cloud tend to require massive amount of training data for supervised machine learning. The amount of data may require, for example, repeat number of occurrences (e.g. more than 50 or 100 occurrences) of each type of objects in the training data that are to be detected. In a case where the frequency of a type of object is 1:1,000,000 (such as a specific type of equipment failure), it would require 100 million objects to be measured into point cloud before the detection of that type of object would be reliable by such conventional fully automated methods. Moreover, the cost and time required for such massive data collection may be practically prohibitive (e.g. billions to hundreds of billions of dollars) may be required. Moreover, in the supervised machine learning based methods, the collection, manual labelling of data, and training the machine learning systems are usually very expensive and impractical. In any case, such tasks need to be done by data scientists that are familiar with machine learning systems, and end-users usually are not able to create their own machine learning systems or models independently. Thus, the time and cost are prohibitive for many new applications.

There are further many technical problems in the conventional fully automated methods related to conventional machine learning systems and methods used to process points in a point cloud to extract features and objects therein. For example, such conventional methods are common in the development of autonomous vehicles, and are configured to have short execution time, accept errors in point classifications and features, and only estimate the approximate properties of a physical object such as position and movement (typically as bounding boxes in space). Such conventional methods suffer from unreliability of detection in objects. Moreover, information from the bounding box is too coarse to be suitable for further analysis, for example, in case of geographic information systems or georeferencing systems having very high accuracy requirements. For example, in case of automated inspection of powerlines, it may be required to measure the shortest distance between two wires in a 3D space with 1 cm accuracy, which is technically not feasible by use of bounding boxes (e.g. an intersection of two bounding boxes of the respective features is not sufficient condition to detect the proximity of the objects. Instead, the individual points within the bounding box need to be correctly classified and their relations considered). Moreover, it is observed that the conventional semi-automated methods typically use fully automated subprocesses to speed up certain manual methods, and thus, have technical problems of both the manual and fully automated methods.

Furthermore, there are certain existing solutions, which are used for processing and classification of two-dimensional (2D) data, but fails (i.e. the performance deteriorates) when processing voluminous 3D data, such as the spatial point cloud data. In an example, a conventional convolutional neural network (CNN) containing typically convolution, maxpool and fully connected layers are increasingly used to process 2D data, such as an image. These methods are usually designed to work with quantized 2D array of pixel values. In an example, an assumption may be made that an end-to-end prediction performance for a conventional 2D image processing method in a general-purpose computer for an 512×512 image may be 20 milliseconds. Assuming the image pixel consists of 8-bit RGB values, the raw (i.e. uncompressed) size of the image would be approximately 0.75 megabyte (MB). However, in case of 3D data, such as spatial point cloud data obtained from the 3D scanning device (e.g. the LIDAR) for 100 meters of a trajectory, driven 20 meters per second, with 100 m range may contain approximately 10 million points in the spatial point cloud data. Further, in the application of the conventional CNN based approach to 3D data is based on representing the points as a 3D array of voxels and to achieve the accuracy requirement of approximately 1 cm in the representing the 3D data as voxels, the raw (uncompressed) size of the matrix of the data would be about 1907 MB, which is almost 2500 times as compared to the 2D data. Many of the performance metrics, such as requirement of computer memory and training time, scales linearly to the size of the input data. Alternatively stated, the more the size of the input data, the time to acquire, process, and analyse such input data increases proportionately, which is not desirable.

In another example, certain attempts have been made to manage the processing of 3D data by converting (i.e. slicing) the 3D data into several 2D images which are processed using conventional 2D machine learning methods. Such conversion may reduce the amount of computer memory required at any given time in the training or induction process, but do not reduce the total amount of data to be processed (given the high accuracy requirement). Another technical problem encountered in such conversion from 3D data into several 2D images is the projection issue, in which only convex objects when scanned from outside may be properly projected. In practical applications, a real-life scene may comprise many objects which are not convex (e.g. objects with holes or empty space, such as vegetations canopies, etc.). Consequently, to fully define the 3D data as a set of 2D projections (slices), it is usually required to project the 3D data into 2D images from various points of view, which results in voluminous input data to be processed. For example, about 1 million 2D images may need to be projected from one 3D point cloud. Thus, using a conventional neural network (e.g. a conventional deep neural network), both the training and induction of the neural network using 1 million 2D images to analyse one scene is computationally non-tractable (i.e. too slow and cost-intensive process). On the other hand, if only certain points of views or partial input is taken, then 2D projections are likely to miss some features, resulting in low accuracy. Moreover, when analysing 2D projected data, for each layer and node of conventional neural network (such as a conventional deep learning method), only the data from a specific 2D-projected image is available. This means that the other 2D-projected images would need to analysed separately. However, as the 3D data to 2D data conversion methods explicitly separate the analysis into independent 2D analyses, only a partial data (a slice at the time) is available, which results in low accuracy of classification. Therefore, it can be inferred that the conventional methods and systems for processing of spatial point cloud data (or even 2D spatial data) require huge amount of training data, produce inaccurate results, and are time consuming, and are thus inefficient and unreliable.

Therefore, in light of the foregoing discussion, there exists a need to overcome the aforementioned drawbacks associated with conventional spatial data processing and classification methods.

SUMMARY

The present disclosure seeks to provide a method for classifying spatial data carried out by a data computing environment. The present disclosure also seeks to provide a data computing environment for classifying spatial data. The present disclosure further seeks to provide a data processing program for classifying spatial data. The present disclosure seeks to provide a solution to the existing problem of requirement of huge amount of training data for classifying the spatial data, slow processing, time and cost intensive processing, and inaccuracy in results of classification of the spatial data. An aim of the present disclosure is to provide a solution that overcomes at least partially the problems encountered in prior art, and provide a time and cost-efficient classification of the spatial data with highly accurate results.

In one aspect, the present disclosure provides a method for classifying a spatial data carried out by a data computing environment, comprising:
    receiving a spatial data from a data source;
    generating a first feature from the spatial data;
    dividing the first feature into a first sub-feature and a second sub-feature;
    analysing the first sub-feature to derive a first sub-feature data;
    analysing the second sub-feature to derive a second sub-feature data;
    using the first sub-feature data and the second sub-feature data as a first input data for analysing the first feature; and
    analysing at least one of the first sub-feature data, the second sub-feature data, and the first feature to classify the spatial data into a plurality of object classes.

In another aspect, an embodiment of the present disclosure provides a data computing environment for classifying a spatial data comprising a processor configured to:
    receive a spatial data from a data source;
    generate a first feature from the spatial data;
    divide the first feature into a first sub-feature and a second sub-feature;
    analyse the first sub-feature to derive a first sub-feature data;
    analyse the second sub-feature to derive a second sub-feature data;
    utilise the first and the second sub-feature data as a first input data for analysing the first feature; and
    analysing at least one of the first sub-feature data, the second sub-feature data, and the first feature to classify the spatial data into a plurality of object classes.

In yet another aspect, an embodiment of the present disclosure provides a data processing program for classifying a spatial data comprising instructions which, when the data processing program is executed by a data computing environment comprising a processor, cause the data computing environment to carry out steps of
    receiving, by the data computing environment, a spatial data from a data source;
    forming a first feature from the spatial data;
    dividing the first feature into a first sub-feature and a second sub-feature;
    analysing the first sub-feature to derive a first sub-feature data;
    analysing the second sub-feature to derive a second sub-feature data;
    using the first and the second sub-feature data as a first input data for analysing the first feature; and
    analysing at least one of the first sub-feature, the second sub-feature, and the first feature to classify the spatial data into a plurality of object classes.

Embodiments of the present disclosure substantially eliminate or at least partially address the aforementioned problems in the prior art, and enables in providing highly accurate results with time and cost-efficient classification of the spatial data. Moreover, the present disclosure is computational resource efficient, for example, requires comparatively very less amount of memory space, and significantly less amount of computations as compared to existing systems and methods. Moreover, the present disclosure requires minimal human intervention and thereby has reduced chances of errors (almost zero error) in classification of the spatial data.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
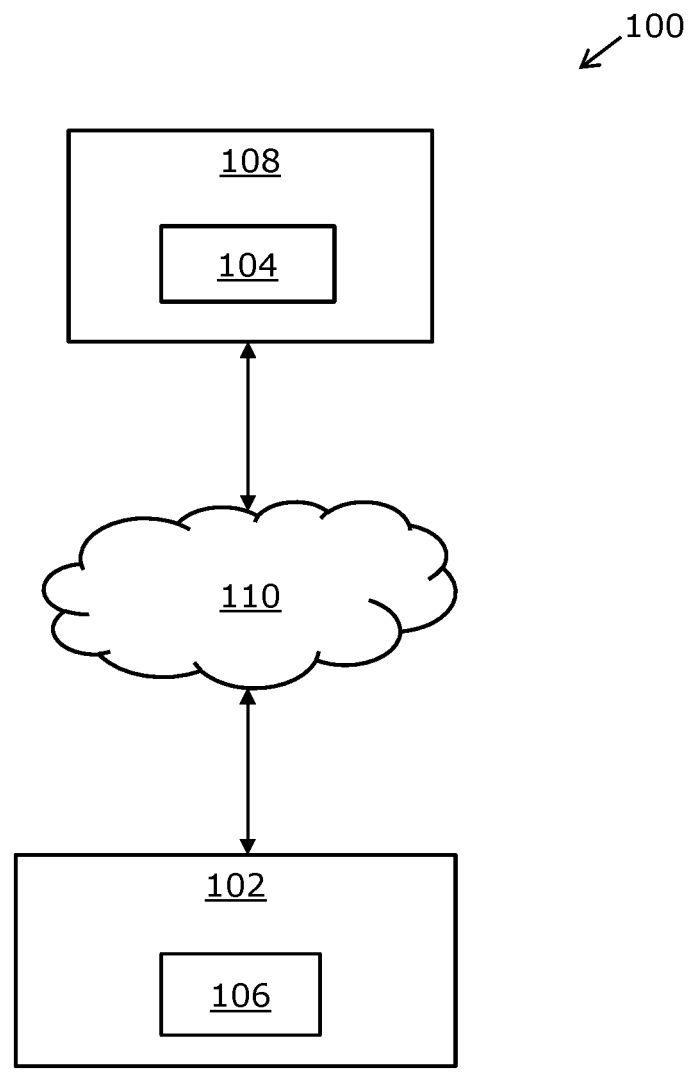
FIG. 1 is a network diagram of a data computing environment for classifying spatial data, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In an aspect, an embodiment of the present disclosure provides a method for classifying a spatial data carried out by a data computing environment, comprising:
  receiving a spatial data from a data source;
  generating a first feature from the spatial data;
  dividing the first feature into a first sub-feature and a second sub-feature;
  analysing the first sub-feature to derive a first sub-feature data;
  analysing the second sub-feature to derive a second sub-feature data;
  using the first sub-feature data and the second sub-feature data as a first input data for analysing the first feature; and
  analysing at least one of the first sub-feature data, the second sub-feature data, and the first feature to classify the spatial data into a plurality of object classes.

In another aspect, an embodiment of the present disclosure provides a data computing environment for classifying a spatial data comprising a processor configured to:
  receive a spatial data from a data source;
  generate a first feature from the spatial data;
  divide the first feature into a first sub-feature and a second sub-feature;
  analyse the first sub-feature to derive a first sub-feature data;
  analyse the second sub-feature to derive a second sub-feature data;
  utilise the first and the second sub-feature data as a first input data for analysing the first feature; and
  analysing at least one of the first sub-feature data, the second sub-feature data, and the first feature to classify the spatial data into a plurality of object classes.

In yet another aspect, an embodiment of the present disclosure provides a data processing program for classifying a spatial data comprising instructions which, when the data processing program is executed by a data computing environment comprising a processor, cause the data computing environment to carry out steps of
  receiving, by the data computing environment, a spatial data from a data source;
  forming a first feature from the spatial data;
  dividing the first feature into a first sub-feature and a second sub-feature;
  analysing the first sub-feature to derive a first sub-feature data;
  analysing the second sub-feature to derive a second sub-feature data;
  using the first and the second sub-feature data as a first input data for analysing the first feature; and
  analysing at least one of the first sub-feature, the second sub-feature, and the first feature to classify the spatial data into a plurality of object classes.

The method, the data computing environment, and the data processing program described in the present disclosure enables processing of spatial data of a real-world scene (i.e. a physical environment) for automated classification of various objects in the real-world scene into a corresponding object class. Notably, the present disclosure enables automatic and accurate classification of an object into a corresponding object class thereby substantially reducing manual effort and implication in such process. Additionally, the present disclosure automatically creates a computationally efficient (i.e. an optimal) deep learning model for such classification of objects, wherein the deep learning model is substantially smaller in size and significantly less-computational resource intensive as compared to conventional models for classification of objects, for example, voxel-based model, point-based model, and the like. Therefore, the smaller size (optimal size) of the deep learning model enables consumption of substantially less working memory space required and storage space in devices where it is implemented and further reduces the hardware cost of memory.

Additionally, the method and the data computing environment described herein is of advantage owing to reduced training time, memory requirements, and computing resources (such as, computing memory, computing power, and the like) requirements of the deep learning model. Furthermore, the method and the data computing environment described herein is fully scalable between different environments (e.g. forest area, urban environment, rural environment, an industrial area, indoors environment and the like). The disclosed method requires substantially reduced amount of human labelled input data for classification of objects in the environment and automatically scales based on a type of the environment or use-case in order to accurately classify objects with great precision. Moreover, the method implemented on the data computing environment can be employed directly by end-users to create customized deep learning models based on their needs and which is more refined for classification of objects in environments specific to the end-users. Beneficially, creation of such deep learning models by the end-users is computationally feasible for the end-users owing to lesser computation and computing resources required for training thereof.

The present disclosure describes the method for classifying the spatial data carried out by the data computing environment. The method and the data computing environment described herein enables processing of the spatial data, specifically, geospatial data, which includes data related to one or more objects present in an environment (e.g. a real-world environment). It will be appreciated that examples of environment where the method and the data computing environment are implemented include, but are not limited to, a farm area, a field, an industrial region (for example, industry, factory, power generation plant, solar farm, wind farm, and so forth), an urban area (for example, a parking area, a commercial area, corporate area, and so forth), and different geographical locations (for example, hills, forest area, and so forth).

Notably, the spatial data refers to geospatial data comprising information about an environment, specifically, various objects present in the environment. The information relating to the various objects in the environment comprise, for example, numerical values in a geographic coordinate system. Optionally, the spatial data for the environment comprises information associated with geometry and/or a geographical location of each object in the environment. In an example, the spatial data comprises location, size and shape of the various objects present in the environment. Examples of the spatial data include, but are not limited to, point cloud data, two-dimensional images, three-dimensional images, and the like.

Optionally, the spatial data is a spatial point cloud data or a spatial two-dimensional data. It will be appreciated that the spatial point cloud data comprises a set of datapoints that represent objects or space in the environment. In an example, the spatial point cloud data is the spatial two-dimensional data when set of datapoints of the spatial point cloud represent information in 'X' and 'Y' geometric coordinates. In another example, the spatial point cloud data is spatial three-dimensional data when set of datapoints of the spatial point cloud represent information in 'X', 'Y' and 'Z' geometric coordinates. In yet another example, the spatial point cloud data is spatial six-dimensional data when set of datapoints of the spatial point cloud represent information in 'X', 'Y' and 'Z' geometric coordinates along with three colour components for red, green and blue colour together representing a point. Additionally, the spatial point cloud data may be, for example, LIDAR data, three-dimensional image from a three-dimensional scanner, and the like. Additionally, the spatial data may be a 3-dimensional grayscale image in 'X' and 'Y' geometric coordinates and a luminance value each representing a point of data.

Moreover, the data computing environment refers to a structure and/or module that include programmable and/or non-programmable components configured to store, process and/or share information. Optionally, the data computing environment includes any arrangement of physical and virtual computational entities (for example, processors) capable of execution of various computational tasks. Optionally, the computing environment is embedded into a device or a vehicle such as camera, vehicle, drone, helicopter, weather station, environmental sensor, of fire detecting equipment or alike. More optionally, the data computing environment is potentially an online infrastructure for remote operation of the data computing environment using, for example, server or cloud environment or offline infrastructure for on-site operation of the data computing environment using a computation entity, such as a computer. Furthermore, it will be appreciated that the online infrastructure of the data computing environment may be single hardware server or plurality of hardware servers operating in a parallel or distributed architecture. Additionally, the data computing environment includes components such as memory, a processor, a network adapter and the like, to store, process and/or share information with other computing components, such as end-user device.

Specifically, the data computing environment for classifying the spatial data comprises the processor to perform the steps of the method. Specifically, the processor refers to a computational element that is operable to respond to and processes instructions that drive the data computing environment. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may be construed to comprise one or more individual processors, processing devices and various elements associated with a processing device that may be shared by other processing devices. Additionally, the one or more individual processors, processing devices and elements are arranged in various architectures for responding to and processing the instructions that drive the data computing environment.

Moreover, the data processing program for classifying the spatial data comprises instructions which, when the data processing program is executed by the data computing environment comprising the processor, cause the data computing environment to carry out steps of the method. Notably, the data processing program refers to a set of instructions executable by a computation element, for example, the processor of the data computing environment, so as to configure the computational element to perform tasks that are the intent of the data computing environment.

Additionally, and optionally, the data processing program encompasses instructions stored in a non-transitory storage medium such as random-access memory (RAM), a hard disk, optical disk, and so forth, associated with the processor (or the data computing environment). Moreover, the data processing program is potentially provided in a firmware. Optionally, the data processing program refers to a software application. More optionally, the data processing program is organized in various ways, for example, in form of software components organized as libraries, Internet-based programs stored on a remote server, a source code, an interpretive code, an object code, a directly executable code, an application, or a computer program product, and so forth. It may be appreciated that the data processing program may invoke system-level code or calls to other software residing in the data computing environment, a third-party platform, or a combination thereof. Furthermore, the data processing program may be pre-configured and pre-integrated with an operating system, building the data computing environment. Optionally, the data computing environment is implemented as a combination of hardware and software, for example, a software application that provides various services (such as, processing service, database service) to other computational devices, modules or apparatus thereby enabling implementation of the data computing environment based on needs specific to the end-users.

The method for classifying the spatial data carried out by the data computing environment comprises receiving the spatial data from the data source. The processor of the data computing environment is configured to receive the spatial data from the data source. Typically, the data source is an organized body of digital information regardless of the manner in which the data or the organized body thereof is represented. Specifically, the data source is stored and accessed electronically, via a computational element. The data source is potentially a hardware, software, firmware and/or any combination thereof.

Optionally, data stored in the organized body of the data source is in form of a table, a map, a grid, a packet, a datagram, a file, a document, a list, a stream, and the like. Additionally, optionally, the data source may be one or more databases hosted by one or more parties, wherein the one or more parties are at least one of: end-users operating the data computing environment, operating users (for example, developers, and the like) associated with the data computing environment, third-party providers providing database services. Optionally, the data source is embedded into a device or a vehicle such as camera, vehicle, drone, helicopter, weather station, environmental sensor, of fire detecting equipment or alike.

Moreover, optionally, the spatial data, for example, the spatial point cloud data, is collected from real-world environment using, for example, LIDAR system, digital imaging device, and the like. Herein, memory associated with the aforesaid devices (namely, the LIDAR system, digital imaging device, and the like) operate as the data source from where the spatial data is provided to the data computing environment. It will be appreciated that the aforesaid devices may store the spatial data in a memory associated therewith temporarily, permanently, or until updated onto a database (for example, a cloud database, a database associated with the data computing platform, and the like). Alternatively stated, in an implementation, the data source is a data recording source, for example, the LIDAR, a three-dimensional (3D) scanner, the digital imaging device (e.g. an image or video camera), which is potentially placed to a moving remote sensing platform (for example, an automotive vehicle, a drone, an aerial vehicle, a locomotive vehicle, an aquatic vehicle, and so forth). Alternatively, optionally, the spatial data is received from, for example, a database hosted by a third-party platform, a database associated with the data computing environment and/or the data processing program, or a combination thereof.

The method further comprises generating the first feature from the spatial data. The processor is configured to generate the first feature from the spatial data. Herein, the first feature refers to a distinctive attribute corresponding to the spatial data. Specifically, the first feature refers to geometric and/or geographic information corresponding to the spatial data based on information associated with each of elements of the spatial data. In an implementation, the first feature is potentially the whole point cloud data. In an example, for a two-dimensional spatial data (for example, two-dimensional image), the first feature comprises information (namely, value) corresponding to 'X' and 'Y' geometric co-ordinates based on elements of the spatial data (for example, pixels of the two-dimensional image). In another example, the first feature for a three-dimensional spatial data (for example, spatial point cloud data) comprises information corresponding to a mean of 'X', 'Y, and 'Z' geometric co-ordinates for elements of the spatial data.

Optionally, in a case where the spatial data is the spatial point cloud data, each point of the spatial point cloud data have certain properties (or attributes), such as time, size, intensity, return number, pulse width, resolution, colour, and the like. A feature (e.g. the first feature) itself directly do not have such properties (or attributes), but is associated with a set of points, which have such properties (or attributes). In an example, the size of the point cloud data in a feature (e.g. the first feature) is derived by a total number of points in the feature (e.g. the first feature) multiplied by a size of the properties each point of the number of points in the feature (e.g. the first feature).

Moreover, the method further comprises dividing the first feature into the first sub-feature and the second sub-feature. The processor is configured to divide the first feature into the first sub-feature and the second sub-feature. Specifically, information of the elements of the spatial data are categorized into two groups (namely, the first sub-feature and the second sub-feature). In this regard, in an implementation, a set of points comprised in the spatial data is divided into two sets.

Moreover, optionally, such division of the elements of the first feature may be, for example, arbitrary, based on information corresponding to each of the elements, based on location information associated with each of the elements, and so forth. In an example, the first sub-feature and the second sub-feature comprises a first set of points at a substantially left-hand-side of a spatial point cloud data and a second set of points at a substantially right-hand-side of the spatial point cloud data respectively. In another example, the spatial data comprising the first feature corresponds to a two-dimensional image of a field having sky region and land region. In such case, the first sub-feature comprises pixels corresponding to the sky region and further information relating to at least one attribute of the pixels corresponding to the sky region and second sub-feature corresponds to the land region and further information relating to at least one attribute of the pixels corresponding to the land region. In an example, the first sub-feature may comprise of points of a specific object (for example a road surface), and the second sub-feature all other points in the first feature not belonging to the first sub-feature.

In an embodiment, the first sub-feature is created by selecting points from the first feature which are spatially correlated with a known geometry, such as a plane, a spline, a line. Optionally such known geometry is expressed as a primary component vectors and eigenvalues in a multidimensional space. For example, all points corresponding to a known 3D geometry of a plane representing a wall of a building shall be in the first sub-feature. For example, all points corresponding to a known geometry of a line representing a streetlamp pole shall be in the second sub-feature. For example, all points corresponding to a known geometry of a line representing a roof ridge in a 2-dimensional image shall be in the second sub-feature.

In an embodiment, the dividing of the first feature comprises: creating a characteristic vector for the first feature using points associated with the first feature; and using a trained deep neural network to determine whether to divide the first feature and a model pattern (which comprises of a logic how) to divide the first feature into the first sub-feature and the second sub-feature based on the created characteristic vector. In other words, the method further comprises using the characteristic vector by using a trained deep neural network (DNN) to decide whether the first sub-feature is to be divided into sub-features and how to divide the first sub-feature into sub features. In an example, model pattern refers to a way of dividing the primary feature or subsequent sub-features. For example, if the spatial point cloud data contains 1000 points that correspond to a 3D scene, it may be decided how the division may be done, for example, in terms of a certain pattern (i.e. the model pattern). In another example, the model pattern may be decided based on the benefit criteria. In an example, the model pattern is precalculated stored information. In an example, the model pattern is a specific algorithm for example Random Sample Consensus (RANSAC), Markov chain Monte Carlo (MCMC), or any other deterministic or stochastic optimization algorithm applied to the data of a feature.

Optionally, a given feature (such as a first feature) is further divided into sub-features (such as a first sub-feature and second sub-feature) only when an expected cost improvement exceeds a threshold value of cost improvement. Optionally, cost improvement may refer to reduction in computational cost associated with classification of spatial data. Optionally, a given feature is further divided into sub-features only when an expected performance improvement exceeds a threshold value of performance improvement. Optionally, the performance improvement may refer to increase in computational speed and/or reduction in required storage space associated with classification of spatial data. Moreover, the recursive division of each feature into further sub-features is dependent on the expected cost improvement and expected performance improvement associated therewith.

Optionally, the trained deep neural network is used to predict if the division of first feature into sub-features and further division of sub-features would increase an accuracy of classification of the spatial data. Optionally, the recursive division of features takes place until further dividing may not increase a benefit to cost ratio associated with division of the sub-feature and classification of spatial data. Optionally, benefit to cost ratio may refer to increase in computation speed and/or reduction in required storage space with respect to a cost associated with increasing the computation speed or decreasing the required storage space. Optionally, the division of sub-features does not take place if the number of points associated with a given sub-feature is less than a threshold number of points required for division of the given sub-feature. Optionally, the division of feature does not take place if the physical dimension size associated with a given feature is less than a threshold value of physical dimension size. Optionally, physical dimension size may refer to a required storage space by a given feature.

In an embodiment, the division of a given feature (such as the first feature) is executed by using statistical techniques such as Principal Component Analysis (PCA) for all points associated with the given feature, and dividing the given feature further into two sub-features if the third largest eigen value is larger than 0.1. Moreover, division of features is recursively performed for all the sub-features using the aforesaid technique. In an example, if the first feature contains 1000 points. It may be decided how the division may be done, for example, in terms of a certain pattern. Optionally, the division of features into sub-features and the sub-features into further sub-features continues till points in the sub-feature closely correspond to a known geometry such as either a plane or a line.

In an embodiment, the method further comprises: computing a benefit criteria from a division of each sub-feature; and recursively dividing each sub-feature into a pair of further sub-features when the benefit criteria from the division is greater than a specified threshold and until a termination criteria is reached. In an embodiment, the benefit criteria comprises at least one of: a decrease in a computational cost at the data computing environment, an increase in performance defined by an accuracy of object classification, or an improvement in a computational cost to performance ratio, and wherein the termination criteria is reached when a number of points in a given sub-feature is less than the specified threshold number of points, or a physical dimension associated with the given sub-feature is less than a specified size threshold. Optionally, the benefit criteria may be pre-defined. More optionally, the specified threshold of the benefit criteria may be pre-defined. In an example, a required percentage decrease in computational cost for the sub-feature to have benefit criteria is pre-defined. Optionally, the method uses the trained deep neural network to compute the benefit criteria. Moreover, the trained deep neural network is used to predict if the division of each sub-feature is beneficial and results in enhanced performance such as enhanced computational speed and increased accuracy of classification of the spatial data. Optionally, the recursive division of each sub-feature into a pair of further sub-features takes place until further dividing may not increase a benefit to cost ratio associated with division of the sub-feature. Optionally, benefit to cost ratio may refer to any benefit such as increase in computation speed and/or reduction in required storage space and/or accuracy of processing with respect to a cost associated with benefit.

The method further comprises analysing the first sub-feature to derive the first sub-feature data. The processor is configured to analyse the first sub-feature to derive the first sub-feature data. Notably, the first sub-feature data refers to a set of values corresponding to a set of attributes associated with the first sub-feature. In an implementation, a relative position of a sub-feature is stored at its parent feature. For example, the position of the first sub-feature is potentially stored in the first feature. This enables each sub-feature to be analysed regardless of their position in their comparatively larger parent features. For example, a classification of a pole (a sub-feature defining an object of in the spatial data) is done regardless of where it lies in terms of which feature (or generally at which portion of the spatial data).

In an embodiment, analysing of the first sub-feature comprises calculating a first representing value for the first sub-feature; and dividing the first sub-feature to a third sub-feature and a fourth sub-feature if the first representing value is greater than a first threshold value. Optionally, the first representing value for each of the elements comprise information corresponding to size of the element, position (coordinates) of the element and the like. Optionally, the first representing value comprises a first set of eigen values (or eigen vectors). It will be appreciated that eigen values are special set of scalars associated with a linear system of equations (for example, a matrix equation corresponding to an attribute of the first sub-feature). Notably, each of the sub-feature (such as the first sub-feature, the second sub-feature, third sub-feature and a fourth sub-feature) has a corresponding representing value associated therewith. Moreover, each sub-feature may have different threshold values of the representing values. Moreover, each sub-feature is divided into further sub-features if the representing value of the sub-feature is greater than the required threshold value of the sub-feature. Optionally, if a representing value of a given sub-feature is greater than a threshold value, the given sub-feature is divided into exactly two sub-features such that each of the two sub-features may be divided further into two sub-features if corresponding representing value is greater than required threshold value. Optionally, each sub-feature has an eigen value associated therewith. In an example, the first sub-feature has a first eigen value and subsequent sub-features of the first sub-feature has a second eigen value and third eigen value respectively.

In an embodiment, analysing of the first sub-feature further comprises: analysing the third sub-feature and the fourth sub-feature to derive a third sub-feature data and a fourth sub-feature data respectively; and utilizing the third sub-feature data and the fourth sub-feature data as a second input data to analyse the first sub-feature. Notably, the third sub-feature data refers to a set of values corresponding to a set of attributes associated with the third sub-feature. The fourth sub-feature data refers to a set of values corresponding to a set of attributes associated with the fourth sub-feature. Optionally, analysing of the third sub-feature comprises calculating a third representing value for the third sub-feature; and dividing the third sub-feature to further sub-features if the third representing value is greater than a third threshold value. In other words, instead of analysing the first sub-feature directly, the third sub-feature data and the fourth sub-feature data are used to analyse the first sub-feature. In other words, each sub-feature data (i.e. the third sub-feature data and the fourth sub-feature in this case) is an input for analysis of the one-level above feature (i.e. the first sub-feature).

Moreover, the method further comprises analysing the second sub-feature to derive the second sub-feature data. The processor is configured to analyse the second sub-feature to derive the second sub-feature data. Notably, similar to the first sub-feature data, the second sub-feature data refers to a set of values corresponding to a set of attributes associated with the second sub-feature. In an example, the position of the second sub-feature is potentially stored in the first feature (i.e. a parent feature of the second sub-feature). This enables each sub-feature to be analysed regardless of their position in their comparatively larger parent features.

In an embodiment, analysing of the second sub-feature comprises: calculating a second representing value for the second sub-feature; and dividing the second sub-feature to a fifth sub-feature and a sixth sub-feature if the second representing value is greater than a second threshold value. Optionally, the second representing value for each of the elements comprise information corresponding to size of the element, position (coordinates) of the element and the like. Optionally, the second representing value comprises a first set of eigen values (or eigen vectors). In an example, the fifth sub-feature and the sixth sub-feature also have a corresponding representing value associated therewith. Moreover, the fifth sub-feature and the sixth sub-feature may have a respective threshold value of the representing values. Moreover, each of the fifth sub-feature and the sixth sub-feature is divided into further sub-features if the representing value of the fifth sub-feature and the sixth sub-feature is greater than the required threshold values. Optionally, the dividing of the second feature comprises: creating a characteristic vector for the second feature using points associated with the second feature; and using the trained deep neural network to determine whether to divide the second feature and a model pattern to divide the second feature into the fifth sub-feature and the sixth sub-feature based on the created characteristic vector.

More optionally, analysing of the second sub-feature further comprises: analysing the fifth sub-feature and the sixth sub-feature to derive a fifth sub-feature data and a sixth sub-feature data respectively; and utilizing the fifth sub-feature data and the sixth sub-feature data as a third input data to analyse the second sub-feature. Beneficially, as the first sub-feature data and the second sub-feature data are used as the first input data (i.e. a bottom-up approach) for analysing the first feature the computation speed and the storage space required for classification of spatial data is considerably low in comparison to conventional technologies. Notably, the fifth sub-feature data refers to a set of values corresponding to a set of attributes associated with the fifth sub-feature. The sixth sub-feature data refers to a set of values corresponding to a set of attributes associated with the sixth sub-feature. Optionally, analysing of the fifth sub-feature comprises calculating a fifth representing value for the fifth sub-feature; and analysing of the sixth sub-feature comprises calculating a sixth representing value for the sixth sub-feature. Optionally, the sixth sub-feature is divided to further sub-features if the sixth representing value is greater than a sixth threshold value.

Moreover, the method further comprises using the first sub-feature data and the second sub-feature data as the first input data for analysing the first feature. The processor is further configured to use the first sub-feature data and the second sub-feature data as the first input data for analysing the first feature. Once the first sub-feature data and the second sub-feature data are derived from analysis of the first sub-feature and the second sub-feature respectively, the first sub-feature data and the second sub-feature data are used to analyse the first feature. In other words, each sub-feature data is an input to the one-level above features (e.g. the first feature in this case). Beneficially, as this approach for analysing does not directly analyse the first feature, the number of computations required such analysis of the first feature are considerably reduces in comparison to conventional methods. Moreover, the method further comprises analysing at least one of the first sub-feature data, the second sub-feature data, and the first feature to classify the spatial data into the plurality of object classes. The processor is further configured to analyse at least one of the first sub-feature data, the second sub-feature data, and the first feature to classify the spatial data into the plurality of object classes. Instead of directly classifying the spatial data into the plurality of object classes from the first feature (e.g. which is representative of the whole spatial data), derived sub-feature data (e.g. the first sub-feature data and the second sub-feature data) from previously divided sub-features (i.e. the first sub-feature and the second sub-feature) are used to classify the spatial data into the plurality of object classes.

Such approach of classification reduces the computational load and the memory space required for processing and classification and increases the accuracy of the classification.

Optionally, the method further comprises generating a hierarchy of a plurality of features to determine a deep neural network structure, wherein the plurality of features comprises the first feature and at least one sub-feature. The hierarchy of a plurality of features is used as an ordered graph for determining the deep neural network structure using known methods for deep learning. Optionally, in the hierarchy, each sub-feature is an input to one level above feature. Optionally, all the points in the spatial data are connected via the hierarchy of the plurality of features in the bottom-up order in comparison to conventional technologies where points are connected in a spatially regularized hierarchy such as voxel space or spatially organized octree. Optionally, the hierarchy comprises the characteristic vector of each feature extracted from the points in spatial data associated with the feature using deep neural network weights which may be shared among a plurality features. Optionally, the sharing of weights is done in one of the methods: all features share the weights, all features of similar size share the weights, all features at the same level in the feature hierarchy share the weights, all features with a similar number of points share the weights, the characteristic vectors of the features are similar, or other alike selection criteria.

In an embodiment, generating the hierarchy of the plurality of features further comprises projecting each point associated with each feature of the plurality of features into a local coordinate system within a feature. In an example, each point is aligned with the eigen vectors and optionally scaled to standard length. Optionally, each point is weighted to compensate a difference in a total number of points in different features.

In an embodiment, the method further comprises applying the trained deep neural network to classify the spatial data into the plurality of object classes. Examples of object classes include but are not limited to buildings, skyscrapers, trees, other vegetation, roads, ground, tower, electrical wires, and further smaller object classes such as object classes of industrial area comprising bolts, screws, nuts, cartoons, tools, and the like. In an example, a sub-feature corresponds to a specific object class.

In an embodiment, the method further comprises iteratively reclassifying one or more object classes in the plurality of object classes to one or more new object classes based on induced classification information associated with each previously classified object. Optionally, the aforementioned steps of recursive division of sub-features are performed till the number of points in a given sub-feature is less than the specified threshold number of points. As a result, the deep neural network classifies or reclassifies object classes at each sub-feature obtained upon the division. In an example, the method potentially identifies three object classes: an electric tower, a road, vegetation. In such an example, the method iteratively reclassifies each of the object classes: electricity tower into new object classes: conductor elements, insulator elements, electricity wires; road into new object class: intersecting road, boulders on road; vegetation into new object class: birds, trees, shrubs, and the like. In an example, the method iteratively first divides the first feature hierarchically into sub-features and classifies the features into classes electric tower and other. Subsequently, the method divides the first feature again hierarchically into sub-features, and classifies the features into classes of electric tower, a road, and other. At each iteration, the classification may increase or decrease the classes to be classified features into. For example, one class is added in each iteration until all classes have been processed. Optionally, the classification information from previous iterations is used in the current iteration.

Exemplary Practical Applications and Real-Life Implementation Examples

In first example, spatial data that needs to be classified consists of 17 points and each point contains just a three-dimensional location of the point, and size of 24 bytes. In such an example, an area of interest is 10 m×10 m×10 m, and the required accuracy is 10 cm. The method of the present disclosure involves using the trained deep neural network, to divide the first feature (e.g. root feature that corresponds to whole 17 points) into sub-features until further division does not increase the benefit to cost ratio or if a sub-feature only contains less than a threshold number of points or a sub-feature is smaller in physical dimension size than a threshold physical dimension size. The division into sub-features is executed, for example, by repeating the dividing into sub-features until points in the sub-feature closely correspond to spatially correlated points of a known geometry, such as a plane or a line. In this example, the division of a given feature (such as the first feature) is executed by using statistical techniques such as Principal Component Analysis (PCA) for all points associated with the given feature, and dividing the given feature further into two sub-features if the third largest eigen value is larger than 0.1. The trained deep neural network (e.g. also referred to as cost-benefit deep neural network) is potentially used to predict how beneficial the subdivision for a feature would be for accuracy and for additional computational cost. In this example, such cost-benefit deep neural network is different from another trained deep neural network used for analysis. This process of division is computationally efficient for later analysis and classification of the spatial data into different object classes as compared to conventional technologies, for example, methods that employ voxel-space deep neural network.

In a second example, it is observed that conventional manual methods used for classification of spatial data often process one object class at a time. For a given physical environment having ground, electric towers, conductors, and vegetation, the manual method typically classifies points associated with ground first, remove points associated with ground from a set of points, classify points of electric towers and conductors, remove the points of electric towers and conductors, and then classify vegetation. In some cases, eliminating the easier object classes first can reduce the complexity of detecting other object classes. However, such conventional method always needs to be manually developed and tested. Typically, the development takes months to years per object class. This approach does not scale to new detection types, classes or needs, as it is too slow, costly, and cannot be done by end-users. Further, if there are 200 object classes needed, human developers can hardly assess the optimal order of object classification. Further, each manually created detection algorithm is based and explicitly relies on the prior phases (that some other object classes have already been detected). This makes it impossible to change and consequently to automate the optimization of manual classification of spatial data. In comparison to conventional methods, the method of the present disclosure, iteratively performs the classification until the improvement is less than a threshold. This allows the trained deep neural network of the present disclosure to classify and reclassify an increasing number of features at each iteration. In an example, by method of present disclosure, in a 5th iteration, points related to conductors get classified as "wires". Several iterations later, in a 76th iteration, the points related to towers get classified to "electric transmission tower". In a 77th iteration, as the points related to the conductors now have the induced classification information (also referred as contextual feature classification) of the towers, the conductors get reclassified as "transmission conductors". In an example, the method enables inspection of powerlines to measure the shortest distance between two wires with very high accuracy (e.g. 1 cm accuracy).

In a third example, in comparison to conventional technologies which require manual selection of arbitrary and fixed order of features for analysis of spatial data, the present disclosure automatically selects an optimum order for classifying individual features (based on dividing and analysis of sub-features) to object classes. As a result, the accuracy is vastly improved. The method of the present disclosure further enables to control a run-time by limiting a number of iterations at cost of accuracy, based on requirements (i.e. provides a flexible approach of classification of spatial data).

In yet another example, the conventional technologies employing point-based approach involving 10 million points of raw data takes around 700 Megabytes of memory space. Further, conventional voxel-based approach further takes approximately 1900 Megabytes of additional memory. However, the method and the system (i.e. the data computing environment) of the present disclosure, for the same amount of raw data (i.e. 10 million points) requires approximately 24 Megabytes of memory (observed during experimentations), which is 28 times less compared to existing methods and systems (i.e. point based approach) and 78 times less compared to existing voxel based approach. Similarly, the training time and computing capacity requirements of disclosed method and system (i.e. the data computing environment) of the present disclosure is significantly reduced.

DETAILED DESCRIPTION OF THE DRAWINGS

Referring to FIG. 1, there is shown a network diagram 100 of a data computing environment 102 for classifying a spatial data 104, in accordance with an embodiment of the present disclosure. The data computing environment 102 comprises a processor 106. The processor 106 is configured to receive the spatial data 104 from a data source 108 via a communication network 110. In an example, the spatial data 104 is a spatial point cloud data of a real-world scene received by the processor 106 from the data source 108 (e.g. a Light Detection and Ranging (LIDAR) that collects the spatial data 104 or a storage device that stores the spatial data 104).

Figure 2:
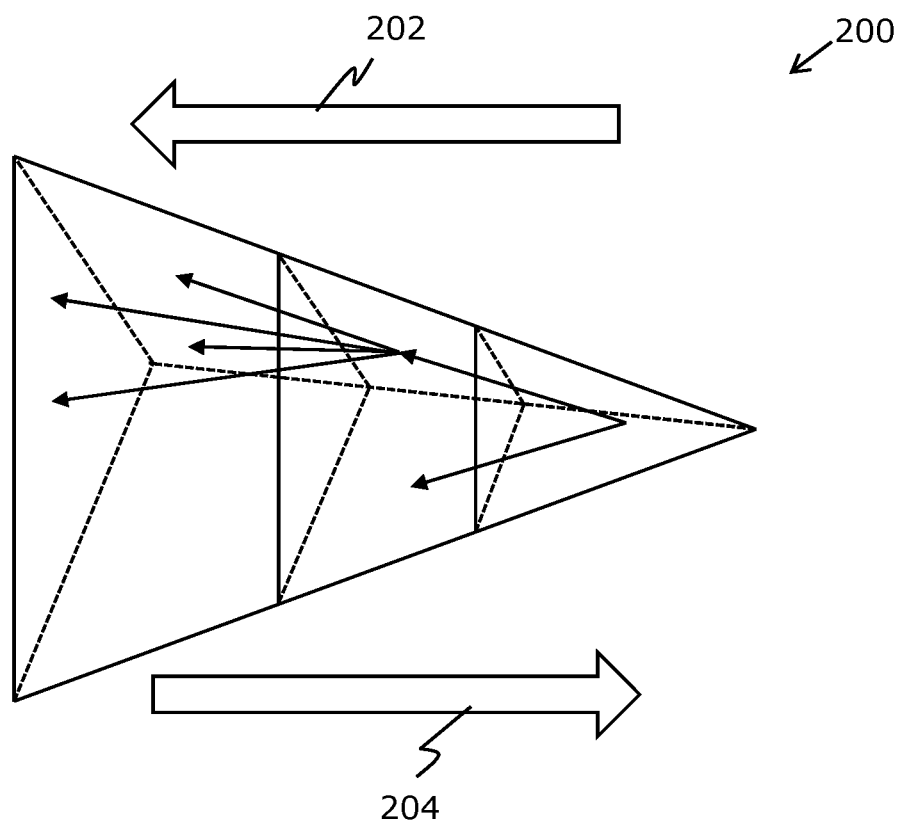
FIG. 2 is a graphical representation of a method for classifying spatial data with two different directions to depict flow of operations, in accordance with an embodiment of the present disclosure.

Referring to FIG. 2, there is shown a graphical representation 200 of a method for classifying a spatial data with two different directions to depict flow of operations, in accordance with an embodiment of the present disclosure. With respect to the graphical representation 200, there is shown a first direction 202 (i.e. a right-to-left pointing arrow). The first direction 202 represents a direction of flow of operations in terms of division of features. For example, a first feature (which may also be referred to as a root feature or a main feature) is divided into a first sub-feature and a second sub-feature in the first direction 202. Moreover, the dividing of the first feature comprises creating a characteristic vector for the first feature using points associated with the first feature and using a trained deep neural network to determine whether to divide the first feature or not and the way (i.e. a model pattern) to divide the first feature into the first sub-feature and the second sub-feature based on the created characteristic vector. Similar to the first feature, the first sub-feature and the second sub-feature are further divided generating a hierarchy of a plurality of features. Such hierarchy of a plurality of features may be used to design a deep neural network structure. With respect to the graphical representation 200, there is further shown a second direction 204 (i.e. a left-to-right pointing arrow). The second direction 204 is opposite of the first direction 202. The second direction 204 represents flow of operations in terms of analysis of sub-features and application of a trained deep neural network to classify the spatial data into a plurality of object classes. For example, the divided first sub-feature and second sub-feature are used for analysing the first feature.

Figure 3A:
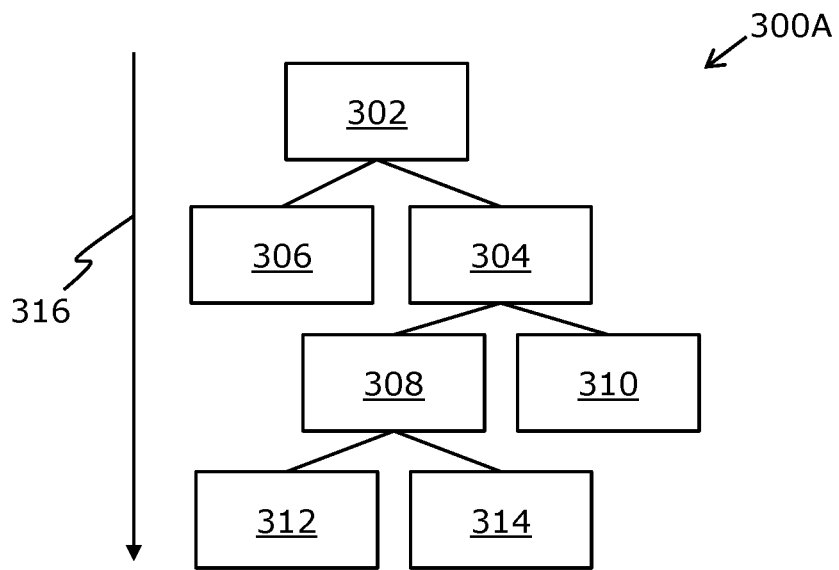
FIGS. 3A, 3B and 3C are illustrations of exemplary scenarios for classifying spatial data by a data computing environment, in accordance with an embodiment of the present disclosure.

Referring to FIG. 3A, there is shown a scenario 300A that illustrates an exemplary process of dividing features, in accordance with an embodiment of the present disclosure. The process of dividing features is a part of the method for classifying spatial data by a data computing environment. A first feature 302 is generated based on the spatial data received from a data source. The first feature 302 is divided into a first sub-feature 304 and a second sub-feature 306. A first representing value is calculated for the first sub-feature 304, and a second representing value is calculated for the second sub-feature 306. The first sub-feature 304 is further divided into a third sub-feature 308 and a fourth sub-feature 310 as the first representing value of the first sub-feature is greater than a first threshold value. In this exemplary scenario 300A, the second sub-feature 306 is potentially not divided as the second representing value of the second sub-feature is less than a second threshold value. Thereafter, the third sub-feature 308 is further divided into a fifth sub-feature 312 and a sixth sub-feature 314. The decisioning and dividing of the first feature 302 (e.g. the root feature) into sub-features described in the scenario 300A occurs in a first direction 316, as shown.

Figure 3B:
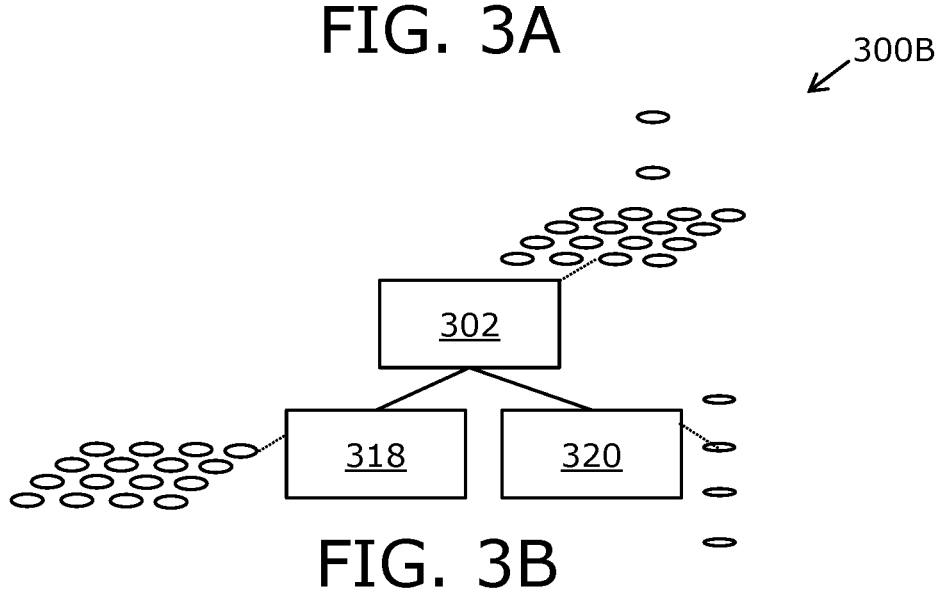

Referring to FIG. 3B, there is shown a scenario 300B that illustrates an exemplary process of dividing features, in accordance with another embodiment of the present disclosure. The process of dividing features is a part of the method for classifying spatial data by a data computing environment. The first feature 302 is generated based on the spatial data received from a data source. The first feature 302 corresponds to whole spatial point cloud data. The first feature 302 is divided into a first sub-feature 318 and a second sub-feature 320. In an example, the first sub-feature 318 is created by selecting points from the first feature 302 which are spatially correlated with a known geometry, such as a plane. Similarly, the second sub-feature 320 is created by selecting points from the first feature 302 which are spatially correlated with a known geometry, such as a line.

Figure 3C:
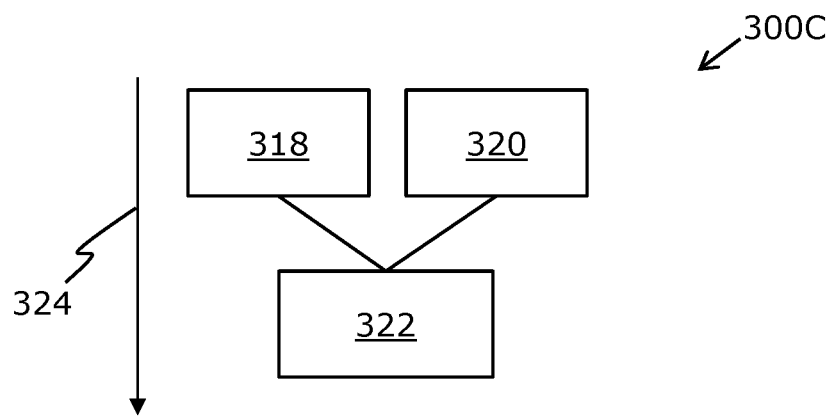

Referring to FIG. 3C, there is shown a scenario 300C that illustrates an exemplary process of analysing features, in accordance with an embodiment of the present disclosure. The process of analysing features is a part of the method for classifying spatial data by a data computing environment. The first sub-feature 318 is analysed to derive a first sub-feature data. The second sub-feature 320 is analysed to derive a second sub-feature data. The first sub-feature 318 and the second sub-feature 320 are separately evaluated (or analysed) in order to analyze a combined feature 322 (also referred to as first feature or root feature that corresponds to the whole spatial data) for classifying spatial data. The analysing of the first sub-feature 318 and the second sub-feature 320 as described in the scenario 300C occurs in a second direction 324, as shown in the FIG. 3C.

Figure 4:
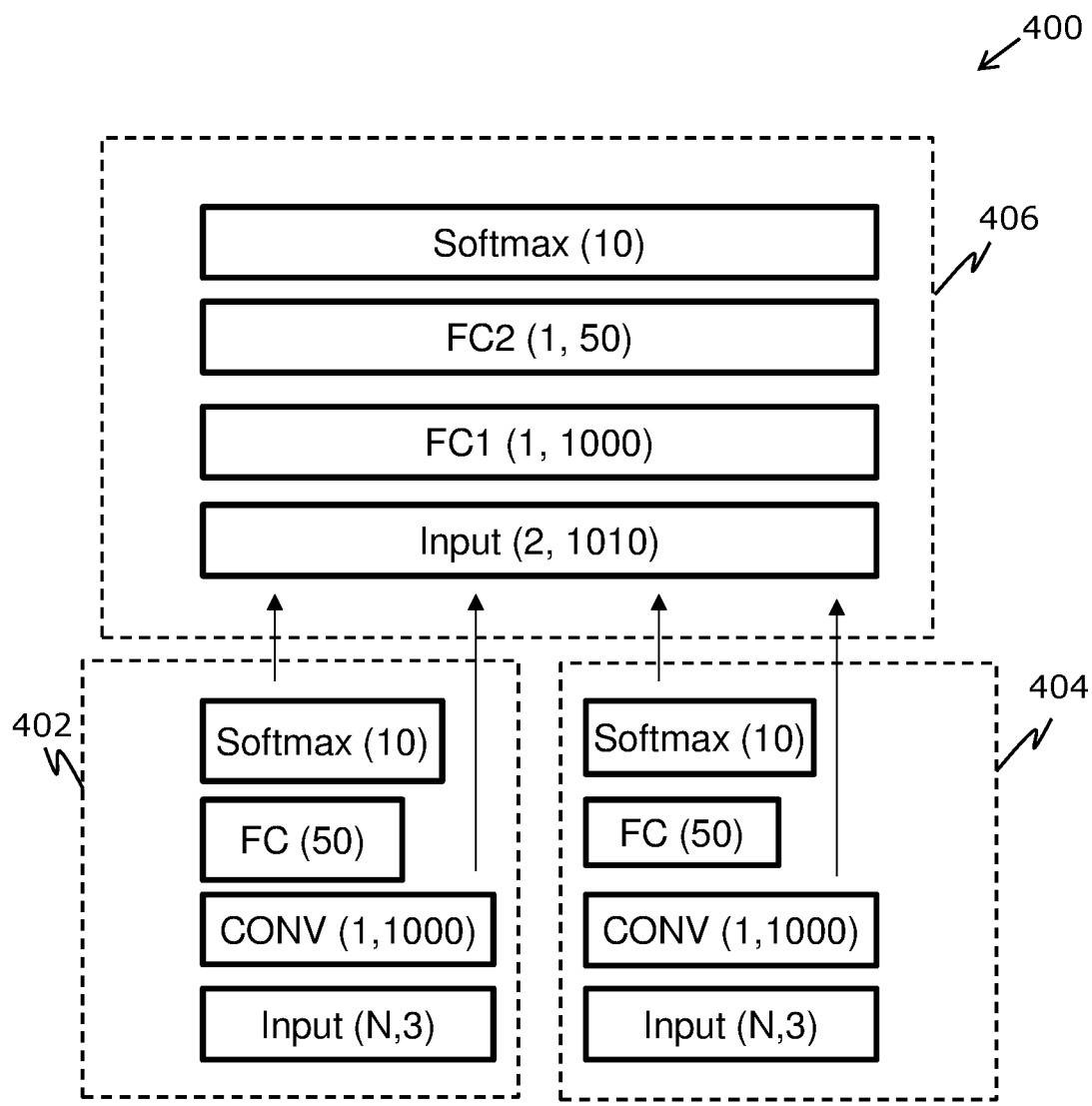
FIG. 4 is an exemplary scenario of classification of spatial data into a plurality of object classes using a trained deep neural network, in accordance with an embodiment of the present disclosure.

Referring to FIG. 4 there is shown an exemplary scenario 400 for classification of spatial data into a plurality of object classes using a trained deep neural network, in accordance with an embodiment of the present disclosure. A first sub-feature 402 is analysed by the trained deep neural network to derive first sub-feature data. Similarly, a second sub-feature 404 is analysed by the trained deep neural network to derive second sub-feature data. Thereafter, the first sub-feature data and the second sub-feature data are used as input data for analysing the first feature 406 (i.e. a combined feature or main feature) in order to classify a plurality of objects from spatial point cloud data. The first feature 406 is generated from the spatial point cloud data, and corresponds to the whole point cloud data. In this embodiment, the plurality of objects are classified into 10 object classes (represented as "Softmax (10)" in the FIG. 4. A softmax layer is typically a final layer used in trained deep neural network, and has same number of nodes as of the output layer of the trained deep neural network. The softmax layer provides output in the form of probability that confirms classification of an object into a specific object class.

In the exemplary scenario 400, "Input (N,3)" represents number of channels of input as 3; "CONV (1,1000)" represents convolutional layer, where number of channels and activation size of convolutional layer is 1000 (number of parameters associated with convolutional layer was about 3001). "FC (50)" represents fully connected layer with number of channels and activation size of 50. Moreover, in the combined feature (i.e. the first feature 406 that corresponds to the whole point cloud data), "Input (2, 1010)" represents input of two features (i.e. first sub-feature 402 and the second sub-feature 404) with number of channels as 1010. The activation size of the input is doubled as there are two features (i.e. 1010*2=2020). Similarly, "FC1" and FC2" represents first fully connected layer and second fully connected layer respectively. "FC1 (1, 1000)" represents first fully connected layer with number of channels and activation size of 1000. "FC2 (1, 50)" represents second fully connected layer with number of channels and activation size of 50. The final layer (represented as "Softmax (10)") represents the spatial point cloud data classified into 10 different object classes with high accuracy.

When tested with existing methods for classification of same spatial point cloud data, the total number of activation size was approximately 10706102 (about 10.7 million), the total number of parameters required was approximately 2811739 (about 2.8 million), and the total number of calculations required was 228133379 (about 228 million). In contradiction to existing methods, in the exemplary scenario 400, for classification of the spatial data into 10 object classes using the trained deep neural network, the total number of activation size required was approximately 5260 (about 5 thousand only), the total number of parameters required was approximately 2124006 (about 2.12 million), and the total number of calculations required was 2233587 (2.23 million). Thus, it required significantly less computational resources in comparison to existing methods of classification of spatial data. It was observed that given the same spatial data and same number of classes (e.g. 10 object classes in this case) to be detected, the method of the present disclosure employing the trained deep neural network required about 2035 lesser number of activations. Each activation is a unit of state of the trained deep neural network and corresponds to memory requirement. Thus, memory space requirement was significantly less as compared to existing methods (e.g. conventional voxel-based method of classification). Further, about 1.3 times lesser number of parameters were used as compared to existing method. Furthermore, about 102 times lesser number of computations were performed to obtain the 10 object classes as compared to existing methods (e.g. voxel-based method of classification).

Figure 5:
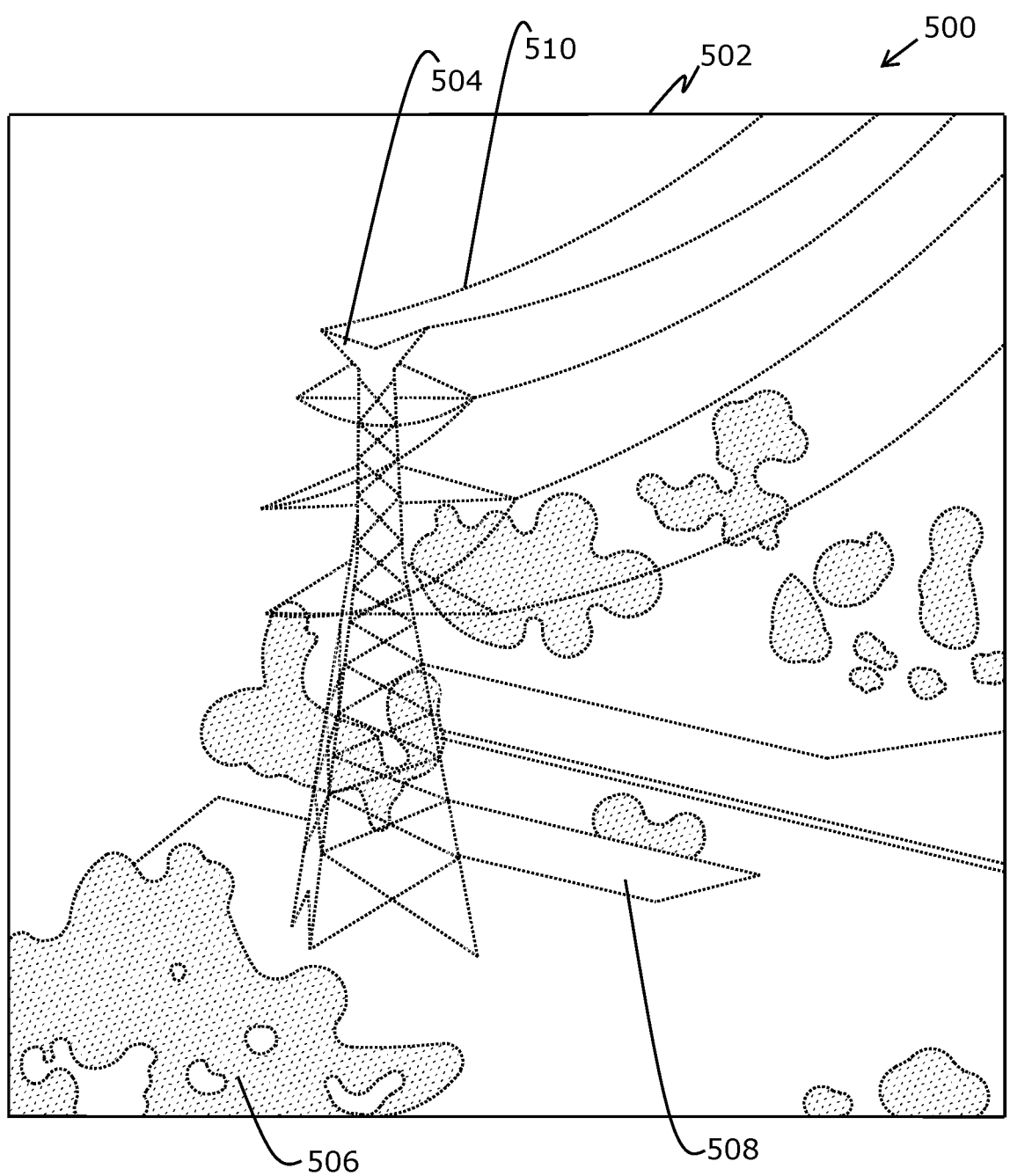
FIG. 5 is an exemplary scenario of implementation of the data computing environment for classification of spatial data, in accordance with an embodiment of the present disclosure.

Referring to FIG. 5 there is shown an exemplary scenario 500 of implementation of the data computing environment for classification of spatial data, in accordance with an embodiment of the present disclosure. The exemplary scenario 500 depicts an exemplary spatial data 502 of a physical real-world environment. The data computing environment applies a trained deep neural network to classify the spatial data into a plurality of object classes. In this case, in the exemplary scenario 500, the spatial data 502 in a first iteration is classified into a plurality of object classes, depicted as a first object 504, a second object 506, a third object 508, and a fourth object 510. Moreover, the first object 504 is classified as a tower, the second object 506 as a road, a third object 508 as a vegetation, and the fourth object 510 as "conductors".

The classification is performed by analysing the sub-features. The data computing environment iteratively reclassifies one or more object classes in the plurality of object classes to one or more new object classes based on induced classification information associated with each previously classified object. In an example, in a $5^{th}$ iteration, points related to conductors (i.e. the fourth object 510) get classified as "wires". Several iterations later, in a $76^{th}$ iteration, the points related to towers (i.e. the first object 504) get classified to electric transmission tower. In a $77^{th}$ iteration, as the points related to the conductors now have the induced classification information (also referred as contextual feature classification) of the towers, the conductors (i.e. the fourth object 510) get reclassified as "transmission conductors" (i.e. the fourth object 510 is re-classified as "transmission conductors"). The process of reclassification is continued if there is improvement in classification of spatial data, thereby increasing accuracy of classification.

Figure 6:
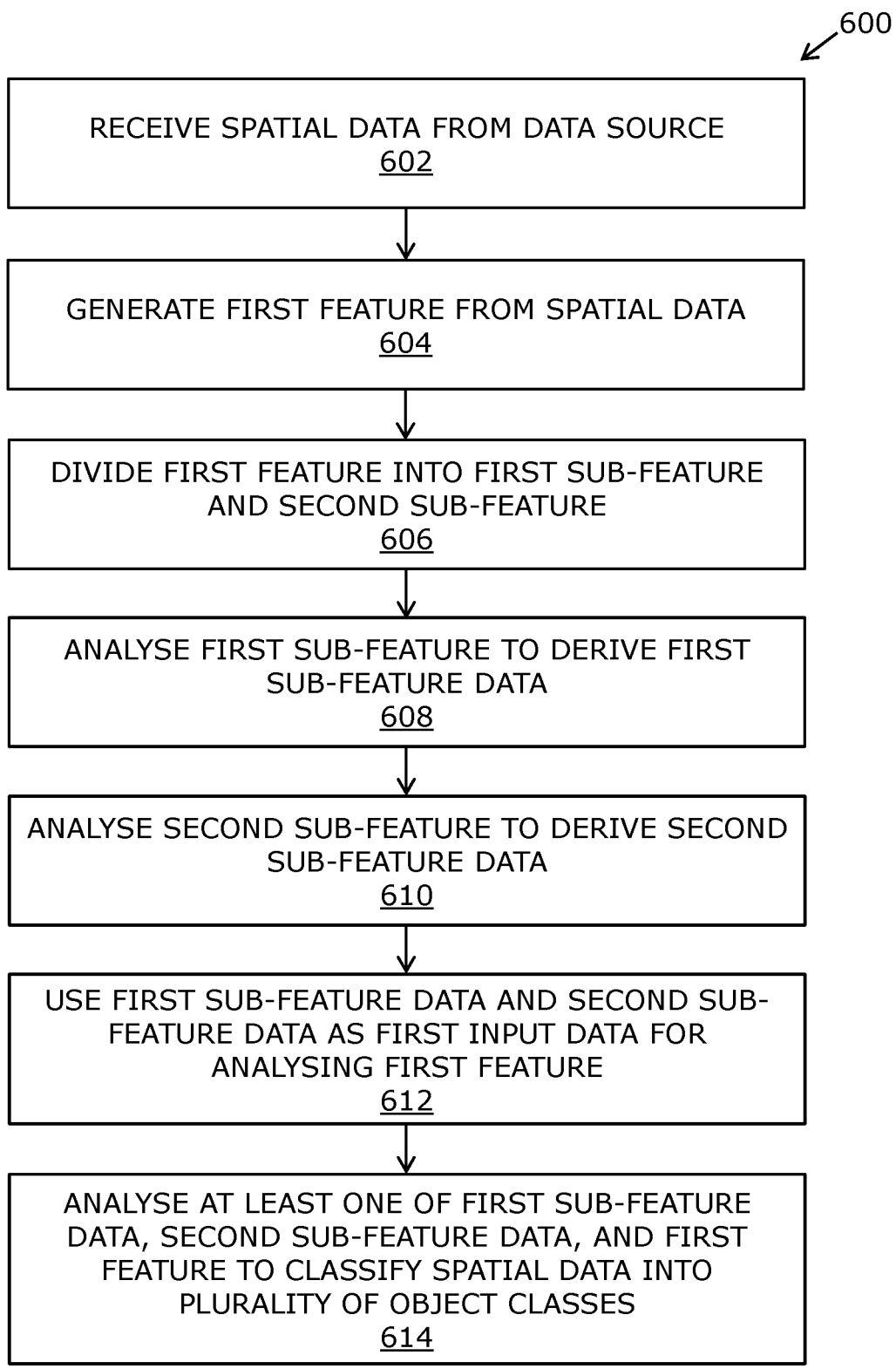
FIG. 6 is a flowchart of a method of (namely, a method for) classifying spatial data carried out by a data computing environment, in accordance with an embodiment of the present disclosure.

Referring to FIG. 6 there shown a flow chart of a method 600 of (namely, a method for) for classifying a spatial data carried out by a data computing environment, in accordance with an embodiment of the present disclosure. At a step 602, a spatial data is received from a data source. At a step 604, a first feature is generated from the spatial data. At a step 606, the first feature is divided into a first sub-feature and a second sub-feature. At a step 608, the first sub-feature is analysed to derive a first sub-feature data. At a step 610, the second sub-feature is analysed to derive a second sub-feature data. At a step 612, the first sub-feature data and the second sub-feature data is used as a first input data for analysing the first feature. At a step 614, at least one of the first sub-feature data, the second sub-feature data, and the first feature is analysed to classify the spatial data into a plurality of object classes.

The steps 602 to 614 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for classifying a spatial data carried out by a data computing environment, comprising:
receiving a spatial data from a data source;
generating a first feature from the spatial data;
dividing the first feature into a first sub-feature and a second sub-feature;
analysing the first sub-feature to derive a first sub-feature data;
analysing the second sub-feature to derive a second sub-feature data;
using the first sub-feature data and the second sub-feature data as a first input data for analysing the first feature;
analysing at least one of the first sub-feature data, the second sub-feature data, and the first feature to classify the spatial data into a plurality of object classes;
computing a benefit criteria from a division of each sub-feature; and
recursively dividing each sub-feature into a pair of further sub-features when the benefit criteria from the division is greater than a specified threshold and until a termination criteria is reached.

2. The method according to claim 1, wherein the analysing of the first sub-feature comprises:
calculating a first representing value for the first sub-feature; and
dividing the first sub-feature to a third sub-feature and a fourth sub-feature if the first representing value is greater than a first threshold value.

3. The method according to claim 2, wherein the analysing of the first sub-feature further comprises:
analysing the third sub-feature and the fourth sub-feature to derive a third sub-feature data and a fourth sub-feature data respectively; and
utilising the third sub-feature data and the fourth sub-feature data as a second input data to analyse the first sub-feature.

4. The method according to claim 1, wherein the analysing of the second sub-feature comprises:
calculating a second representing value for the second sub-feature; and
dividing the second sub-feature to a fifth sub-feature and a sixth sub-feature if the second representing value is greater than a second threshold value.

5. The method according to claim 4, wherein the analysing of the second sub-feature further comprises:
analysing the fifth sub-feature and the sixth sub-feature to derive a fifth sub-feature data and a sixth sub-feature data respectively; and
utilising the fifth sub-feature data and the sixth sub-feature data as a third input data to analyse the second sub-feature.

6. The method according to claim 1, wherein the dividing of the first feature comprises:
creating a characteristic vector for the first feature using points associated with the first feature; and
using a trained deep neural network to determine whether to divide the first feature and a model pattern to divide the first feature into the first sub-feature and the second sub-feature based on the created characteristic vector.

7. The method according to claim 1, wherein the benefit criteria comprises at least one of: a decrease in a computational cost at the data computing environment, an increase in performance defined by an accuracy of object classification, or an improvement in a computational cost to performance ratio, and wherein the termination criteria is reached when a number of points in a given sub-feature is less than the specified threshold number of points, or a physical dimension associated with the given sub-feature is less than a specified size threshold.

8. The method according to claim 1, wherein the method further comprises generating a hierarchy of a plurality of features to determine a deep neural network structure, wherein the plurality of features comprises the first feature and at least one sub-feature.

9. The method according to claim 8, wherein the generating the hierarchy of the plurality of features further comprises projecting each point associated with each feature of the plurality of features into a local coordinate system within a feature.

10. The method according to claim 1, wherein the method further comprises applying the trained deep neural network to classify the spatial data into the plurality of object classes.

11. The method according to claim 1, wherein the method further comprising iteratively reclassifying one or more object classes in the plurality of object classes to one or more new object classes based on an induced classification information associated with each previously classified object.

12. The method according to claim 1, wherein the spatial data is a spatial point cloud data or a spatial two-dimensional data.

13. A data computing apparatus for classifying a spatial data the data computing apparatus comprising a non-transitory computer readable medium including machine readable instructions which when executed by a processor are configured to cause the data computing apparatus to:
receive a spatial data from a data source;
generate a first feature from the spatial data;
divide the first feature into a first sub-feature and a second sub-feature;
analyse the first sub-feature to derive a first sub-feature data;
analyse the second sub-feature to derive a second sub-feature data;
utilise the first and the second sub-feature data as a first input data for analysing the first feature;
analysing at least one of the first sub-feature data, the second sub-feature data, and the first feature to classify the spatial data into a plurality of object classes;
computing a benefit criteria from a division of each sub-feature; and
recursively dividing each sub-feature into a pair of further sub-features when the benefit criteria from the division is greater than a specified threshold and until a termination criteria is reached.

14. The data computing apparatus according to claim 13, wherein the spatial data is a spatial point cloud data or a spatial two-dimensional data.

15. A computer program product for classifying a spatial data residing on a non-transitory computer readable medium comprising machine readable instructions which, when executed by a a processor, cause the processor to carry out steps of:
receiving, by the data computing environment, a spatial data from a data source;
forming a first feature from the spatial data;
dividing the first feature into a first sub-feature and a second sub-feature;
analysing the first sub-feature to derive a first sub-feature data;

analysing the second sub-feature to derive a second sub-feature data;
using the first and the second sub-feature data as a first input data for analysing the first feature;
analysing at least one of the first sub-feature, the second sub-feature, and the first feature to classify the spatial data into a plurality of object classes;
computing a benefit criteria from a division of each sub-feature; and
recursively dividing each sub-feature into a pair of further sub-features when the benefit criteria from the division is greater than a specified threshold and until a termination criteria is reached.

16. The computer program product according to claim 15, wherein the spatial data is a spatial point cloud data or a spatial two-dimensional data.

\* \* \* \* \*